United States Patent [19]

Kessick et al.

[11] Patent Number: 4,661,240

[45] Date of Patent: Apr. 28, 1987

[54] LOW SULFUR COKE USING DISPERSED CALCIUM

[75] Inventors: Michael A. Kessick; Zacharia M. George; Linda G. Schneider, all of Edmonton, Canada

[73] Assignee: Alberta Research Council, Edmonton, Canada

[21] Appl. No.: 591,561

[22] Filed: Mar. 20, 1984

Related U.S. Application Data

[63] Continuation-in-part of Ser. No. 563,557, Dec. 20, 1983, abandoned, which is a continuation of Ser. No. 157,938, Jun. 9, 1980, abandoned, and a continuation-in-part of Ser. No. 157,939, Jun. 9, 1980, abandoned.

[30] Foreign Application Priority Data

Jun. 8, 1979 [GB] United Kingdom ............... 7920001

[51] Int. Cl.⁴ ........................... C10G 9/32; C10G 9/14
[52] U.S. Cl. .................................. 208/127; 208/131; 201/17; 44/1 SR
[58] Field of Search .............. 208/131, 127; 44/1 SR; 201/17

[56] References Cited

U.S. PATENT DOCUMENTS

| | | | |
|---|---|---|---|
| 1,545,620 | 7/1925 | Trent | 201/17 |
| 2,953,518 | 9/1960 | McKinley et al. | 208/127 |
| 3,640,016 | 2/1972 | Lee et al. | 44/1 SR |
| 3,661,719 | 5/1972 | Kelmar | 201/17 |
| 3,707,462 | 12/1972 | Moss | 208/127 |
| 3,723,291 | 3/1973 | Thacker | 201/17 |
| 4,049,538 | 9/1977 | Hayashi et al. | 208/131 |
| 4,220,518 | 9/1980 | Uchida et al. | 208/130 |
| 4,305,809 | 12/1981 | Chen et al. | 208/127 |
| 4,427,540 | 1/1984 | Hsu et al. | 208/131 |
| 4,479,804 | 10/1984 | Chen et al. | 44/1 SR |
| 4,521,382 | 6/1985 | Kessick et al. | 208/127 |
| 4,521,383 | 6/1985 | Kessick et al. | 208/127 |

FOREIGN PATENT DOCUMENTS

| | | | |
|---|---|---|---|
| 0098287 | 8/1981 | Japan | 44/1 SR |
| 0159291 | 12/1981 | Japan | 44/1 SR |

*Primary Examiner*—John Doll
*Assistant Examiner*—Lance Johnson
*Attorney, Agent, or Firm*—Sim & McBurney

[57] ABSTRACT

The sulphur emissive capability, on combustion, of coke which is formed during upgrading of sulphur-containing heavy crude oils, including oil sands bitumen, and residua, is decreased by the addition of calcium carbonate, calcium hydroxide or calcium oxide, in particulate form, to the heavy crude oil prior to coking, and uniformly dispersing the same therein. The presence of the calcium compound leads to an increased yield of liquid distillates from the coking process under the coking conditions. For calcium carbonate, the Ca:S ratio is about 1:5 to 1:1 and the coking temperature is about 400° to 500° C. For calcium hydroxide and calcium oxide, the Ca:S ratio is about 1:3 to 1:1 and the coking temperature is about 450° to about 500° C.

13 Claims, No Drawings

LOW SULFUR COKE USING DISPERSED CALCIUM

REFERENCE TO RELATED APPLICATIONS

This application is a continuation-in-part of our co-pending U.S. patent application Ser. No. 563,557 filed Dec. 20, 1983 (now abandoned) which itself is a continuation of Ser. No. 157,938 filed June 9, 1980, (now abandoned) continuation-in-part of our copending U.S. patent application Ser. No. 157,939 filed June 9, 1980 (now abandoned).

FIELD OF INVENTION

The present invention is directed to the recovery of coke from the upgrading of heavy crude oils.

BACKGROUND TO THE INVENTION

Heavy crude oils and residua are characterized by an API (American Petroleum Institute) gravity value of less than 25°, usually less than 20°, and, when upgraded for the recovery of useful products, are subjected to a so-called "coking" operation, in which volatiles are evaporated off and recovered, leaving a solid carbonaceous solid, known as "coke". The quantity of coke so formed may vary, and is usually in the range of about 10 to 25 wt.% of the oil.

The latter product is potentially useful as a fuel. Unfortunately many heavy crude oils and residua, for example, oil sands bitumen, contain substantial quantities of sulfur, in the form of sulfur compounds, and the coke which results from the coking step also contains substantial quantities of the sulfur. Upon combustion of such coke, substantial quantities of undesirable sulphur dioxide are formed, necessitating elaborate and expensive sulphur dioxide removal equipment if the coke is to be used as a source of thermal energy.

SUMMARY OF INVENTION

In accordance with the present invention, it has been found that coke having a decreased tendency for sulfur emission upon combustion can be produced by effecting the coking under critical conditions using critical proportions of certain calcium compounds.

In the method of the invention, a finely divided calcium compound which is calcium carbonate, calcium hydroxide or calcium oxide, is thoroughly intermixed with the sulfurous heavy crude oil or residua to uniformly disperse the particulate calcium compound throughout the liquid phase.

The amount of particulate calcium compound used is related to the quantity of sulfur present in the heavy crude oil and is at a molar ratio of Ca:S of about 1:1 or less, down to about 1:5 in the case of calcium carbonate and down to about 1:3 in the case of calcium hydroxide and calcium oxide. The quantity of calcium compound premixed with the heavy crude oil or residua is all the quantity of calcium compound which is used in the cooking step. In addition, the calcium compound is the sole coking additive introduced to the coker with the crude oil.

The mixture of the heavy crude oil having the calcium compound thoroughly dispersed therethrough is introduced to a coking zone wherein volatiles are driven off and coke is formed. The coking temperature is critical to the invention. In the case where calcium carbonate is the calcium compound, the coking is effected at a temperature of about 400° to about 500° C., whereas, in the case where calcium hydroxide or calcium oxide is the calcium compound, the coking is effected at a temperature of about 450° to about 500° C.

The volatiles driven off in the coking operation are recovered for further processing, while the coke product also is removed. The coke which is formed by this process has a decreased tendency to produce sulfur dioxide upon combustion, as compared with coke which is produced directly from the heavy crude oil without addition of the calcium compound prior to coking.

The calcium compound addition does not affect the concentration of sulfur which is present in the condensible volatile fraction of the coker gases and is present in the liquid distillates. The sulfur present in the liquid distillate must be removed during further upgrading.

During the coking operation, the sulfur present in heavy crude oil partitions between the solid phase coke and the gaseous phase volatiles. It should further be noted that there is no desulfurization of the heavy crude during coking, in the sense of removal of a quantity of the original sulfur content of the heavy crude oil, but rather the same overall quantity of sulfur results from the coking, partitioned between the solid and gaseous phases. What does result is that the sulfur present in the coke is bound in a form which prevents the formation of sulfur dioxide upon combustion of the coke. Further, it has also been observed that sulfur normally leaving the coker in the incondensible gases also is bound in the coke.

It is also possible to inhibit the formation of sulphur dioxide during coke combustion by mixing the calcium compound with preformed coke, but a much larger quantity of calcium compound is required when compared with premixing of the calcium compound with the oil prior to coking as in this invention and no decrease in the sulfur content of the incondensible coker gases results when calcium hydroxide is employed.

GENERAL DESCRIPTION OF INVENTION

The calcium compound is used in powdered dry form and is thoroughly dispersed in the liquid heavy crude oil prior to coking. Finely divided particles are preferred since a more complete dispersion is achieved thereby for the same quantity of calcium compound, thereby improving the degree of inhibition of sulfur compound. The calcium compound usually possesses a particle size from about 5 to about 50 microns, preferably from about 5 to about 10 microns.

The calcium compound used in this invention is calcium carbonate, calcium hydroxide or calcium hydroxide. Mixtures may be used, if desired. When the calcium compound is calcium carbonate, it is preferably used in a natural form, such as, limestone.

When the calcium compound is calcium oxide, it may be used in the form of pure lime or lime formed from natural materials, such as, calcined limestone. In view of the handling difficulties associated with calcium oxide, it is preferred to use the same in its slaked form, i.e. as calcium hydroxide. Such slaked lime may be formed from pure lime or from lime formed from limestone. The ability to use cheap and readily available materials to provide the additive calcium compound is of considerable benefit to the economics of the process of the invention.

The quantity of calcium compound used depends on the degree of sulphur removal desired and the particular calcium compound which is used. Generally, the degree of decrease in sulfur production increases with increasing quantities of calcium compound, until further additions confer no additional benefits. The absolute quantities of calcium compound used are related to the quantity of sulfur present in the oil, and hence the quantities of calcium compound added are best expressed in terms of the molar ratio of calcium in the calcium compound and sulfur in the heavy crude oil or residua.

In the case of calcium carbonate, it is necessary to use a minimum mole ratio of Ca:S of about 1:5 to achieve a significant degree of decrease in sulfur emission upon combustion of the coke product, while for calcium hydroxide and calcium oxide, it is necessary to use a minimum mole ratio of Ca:S of about 1:3 to achieve the same result. In all cases, adding more calcium compound than that which produces a Ca:S molar ratio of about 1:1 does not improve the degree of decrease of the sulfur-emissive capacity of the product coke. Preferably, a molar ratio of Ca:S of about 1:2 is used in the bitumen or heavy oil, resulting in a mole ratio of Ca:S in the coke of about 1:1.

These molar ratios for the calcium compound correspond, for typical sulfur concentrations of heavy crude oils and residua with which the present invention is concerned, to about 2.0 to about 8.0 wt.% of the oil for calcium carbonate, about 3.0 to about 8.0 wt.% of the oil for calcium hydroxide and about 3 to about 7 wt.% of the oil for slaked lime. Relatively small quantities of calcium compound, therefore, are used to achieve a significant result.

The mechanism whereby the present invention is able to achieve decreased sulfur emission for the coke upon combustion of the same and the decreased sulfur compound content of the incondensible coker gases is theorized to be as follows. On heating during coking, the sulfur present in the crude oil or residua forms calcium sulfide with the calcium compound. Upon combustion of the coke when used for its fuel value, the calcium sulfide is oxidized to form calcium sulfate, rather than breaking down to form sulfur dioxide, such as would occur with oxidation of non-bound sulfur compounds if the calcium compound were absent from the coking step.

As may be seen from the above-recited quantities of calcium compound which are used in this invention, it is preferred to use less than the stoichiometric quantity of calcium compound which would be necessary to bind all the sulfur in the bitumen or heavy oil in accordance with the above theory.

As noted above, additions of calcium compounds to already-formed coke will achieve a decrease of the sulfur emissive capacity of the coke but to achieve a degree of decrease of the sulfur emissive capacity of the coke comparable to that achieved at the molar ratio of Ca:S of 1:2, on a bitumen basis, in this invention, it is necessry to use a quantity of calcium compound corresponding to a Ca:S ratio of about 2:1 or higher depending on the degree of mixing, a substantially and significantly higher quantity.

It is considered surprising that it is possible to achieve a significant and substantial degree of decrease in the sulfur-emissive capacity of the coke and also in the sulfur content of the incondensible coker gases with such small quantities of calcium compound. It is believed that the thorough mixing of the powdered calcium compound and its uniform dispersion throughout the liquid oil phase prior to coking, combined possibly with some physical adsorption of sulfur compounds from the liquid phase by the calcium compound prior to coking, is responsible for the observed results. There may also be some chemical reaction between the acidic components of the oil and the calcium bases during the initial stages of the coking reaction.

The coking operation may be effected in any desired manner in a coking zone to which the dispersion of crude oil and calcium compound are introduced, such as, by delayed coking or by fluid coking. As noted earlier, it is also important to this invention, that the coking be effected in a critical temperature range for coke of significantly decreased sulfur-emissive capacity to be formed. The actual temperature range used depends on the calcium compound used.

For calcium carbonate, the coking temperature range is about 400° to about 500° C. Below the lower limit, excessive quantities of calcium carbonate are required to achieve a significant degree of decrease in sulfur-emissive capacity of the coke while above the upper temperature substantial quantities of incondensible gaseous combustion products are formed, which is considered undesirable for further processing of the gaseous products of the coking operation.

An additional benefit has been observed when calcium carbonate is used as the calcium compound and a coking temperature in excess of about 450° C. is used, in that the yield of liquid distillate from condensing the gaseous products of the coking operation is increased, as compared with coking the heavy crude oil in the absence of such calcium carbonate. A similar increased yield of liquid distillate is obtained when calcium hydroxide and calcium oxide are used as the calcium compound.

For calcium hydroxide and calcium oxide, the coking temperature range is from about 450° to about 500° C. At coking temperatures below about 450° C., excessive quantities of slaked lime are required to achieve a substantial degree of sulphur emission from combustion of coke resulting from the coking operation while at temperatures above about 500° C., as noted above for calcium carbonate, the undesirable formation of substantial quantities of incondensible gaseous products of combustion occurs. The coking temperature preferably is about 460° to about 480° C., since it has been found that the calcium compound is most effective in this range.

An additional benefit which has been observed in the utilization of calcium hydroxide as the calcium compound is that the yield of hydrogen sulfide in the noncondensible portion of the gaseous phase emanating from the coker decreases with increasing quantities of calcium compound and is practically eliminated at higher values, a highly desirable result when the coker gas is to be used as a gaseous fuel. Although not specifically tested for, it is highly likely that calcium carbonate and calcium oxide produce a similar result.

As the coking operation proceeds, the gaseous products of combustion are removed from the coking zone and subjected to condensation, at least partially to form a liquid distillate product. Once coking is complete, the solid coke is removed from the coking zone. The coke may subsequently be burned for its fuel value, without the formation of any significant sulfur emission.

The process of the present invention, therefore, produces a coke having decreased sulfur-emissive capability by using defined narrow range of small quantities of certain calcium compounds in a narrowly-defined temperature range.

PRIOR ART

The applicants hereby make of record the following U.S. Patents as being the closest known prior art:

| | |
|---|---|
| 2,959,518 | McKinley et al |
| 3,707,462 | Moss |
| 3,907,662 | Kubota et al |
| 3,915,844 | Ueda et al |
| 3,923,635 | Schulman et al |
| 4,216,197 | Moss |

For reasons described herein, applicants believe their invention to be clearly patentably distinguished from this prior art.

McKinley et al teaches a process for coking oil using a fluidized bed of calcium oxide particles. In this process, a fluidized bed of calcium oxide particles is established at a temperature of approximately 450° to 800° C., preferably about 600° to 700° C., onto which is sprayed heavy hydrocarbon feeds. Coking occurs in the fluidized bed, volatiles being driven off and carbon depositing on the calcium oxide particles. This patent does not mention that sulfur and accordingly does not teach the formation of a coke of decreased sulfur emissivity.

As mentioned previously, the present invention involves mixing of all the calcium compound used with the sulphur-containing heavy crude oil prior to coking and recovery of a coke having utility for its fuel value. In McKinley et al, the oil, which is not disclosed to be sulfur-containing, is sprayed onto a fluidized bed of calcium oxide particles. Since a fluidized bed must be maintained, a considerable preponderance of calcium oxide particles when compared with oil must be used. There is, therefore, no teaching in McKinley of premixing of all the calcium oxide reactant with the oil in molar proportion of Ca:S of up to 1:1, as in this invention. Further, in McKinley, no attempt is made to recover the coke for its fuel value, such as is effected in this invention. In contrast, McKinley recovers a coke-lime product containing about 60% calcium oxide, from which calcium carbide preferably is formed.

Moss '462 (U.S. Pat. No. 3,707,462) also teaches a fluidized bed process for effecting coking of heavy crude oils. In this instance, the presence of sulfur in the crude oil is specifically recited and the process is designed to react calcium oxide particles with the sulfur in the heavy crude oil to form calcium sulfide at a temperature of 500° to 700° C. The coke-lime particles resulting from the fluidized bed are oxidized at a higher temperature of 800° to 1000° C. to burn off the coke as carbon dioxide while the calcium sulfide is converted to calcium sulfate. Finally, the calcium sulfate particles are decomposed at a yet higher temperature of 1000° to 1500° C. to convert the calcium sulfate to calcium oxide and sulfur dioxide. The reconstituted calcium oxide particles are recycled to the fluidized bed.

As in the case of McKinley et al, in Moss '462 there is no teaching of premixing all the calcium compound in a limited quantity with the sulfur-containing heavy crude oil prior to feed to the coker as in this invention, but rather the sulfur-containing heavy crude oil is sprayed onto a fluidized bed of calcium oxide particles, so that a vast preponderance of calcium oxide exists. No attempt is made in Moss '462 to recover the coke but rather it is simply burnt off. Moss et al '462 uses a coking temperature of 500° to 700° C. and states that temperatures below 500° C. should not be employed as the conversion rate is uneconomical. In contrast, this invention uses temperatures only up to 500° C. and preferably 460° to 480° C., to obtain the benefits discussed above.

Kubota et al also teaches a fluidized bed coking process which uses an alkali metal carbonate particle in the fluidized bed. As in McKinley et al and in Moss '462, there is no premixing prior to coking. In addition, this reference uses an alkali metal carbonate whereas the present invention uses a calcium compound, i.e., an alkaline earth metal compound.

It should be noted that McKinley et al, Moss '462 and Kubota et al all teach variations on the conventional fluid coking procedure, wherein coking is effected in the fluidized bed of coke particles, the variation being to substitute other materials for the coke particles. The present invention also can use fluid coking to effect coking of the heavy crude oil, but in its conventional mode of operation. The invention also may effect coking by a delayed coking procedure, not involving a fluidized bed.

Ueda et al teaches the coking of heavy crude oils at temperatures of 400° to 650° C. and gasification of the coke at 800° to 1200° C. In this process, an alkali metal compound is fed into the coker independently from the heavy crude oil to act as seed particles to enhance coke formation. The Ueda et al reference, therefore, does not teach the premixing step which is essential to the invention. In addition, the present invention uses a calcium compound as the sole coking additive to the crude oil prior to coking, whereas Ueda et al separately feeds alkali metal compounds to the coker. It is mentioned in Ueda et al that the alkali metal compound may be supported on an alkaline earth metal compound and, as examples of such compounds, calcium oxide and calcium carbonate are specifically recited. No effect of the presence of such calcium compound is taught by Ueda et al, other than as a carrier for the alkali metal compound.

Schulman et al also teaches a heavy crude oil upgrading process which utilizes an alkali metal compound. In this prior art, hydrogenation of the crude oil is followed by coking. This prior art does not teach that coke of decreased sulfur emissivity can be formed by premixing a calcium compound with the crude oil prior to coking.

Moss '197 (U.S. Pat. No. 4,216,197) is concerned with a process for conversion of calcium sulphide to calcium oxide by oxidation. The calcium sulphide may be formed by desulfurization of fuels and gases containing sulphur compounds which react with calcium oxide or thermal precursors thereof, such as, calcium carbonate. Specific reference is made to the Moss '462 process. This prior art presupposes the formation of calcium sulphide in a recoverable form, and is specifically concerned with the disposal problem that such recovery produces. There is no teaching of premixing a calcium compound with a sulfur-containing heavy crude oil and coking that mixture to form a coke which has a decreased tendency to emit sulfurous gases upon oxidation, such as is effected in this invention.

Although both McKinley et al and Ueda et al teach temperature ranges for coking which encompass the ranges utilized herein, there is no teaching of the criticality of using a temperature in the range of 400° to 500° C. in the case of calcium carbonate and 450° to 500° C. in the case of calcium oxide or calcium hydroxide, as utilized herein.

From this discussion of the closest known prior art, it is apparent that there is no teaching therein of the process of the invention. In particular, the prior art does not contemplate a procedure in which a limited quantity of a calcium compound first is uniformly dispersed in a sulfur-containing crude oil such as to produce a maximum Ca:S molar ratio of 1:1, the resulting mixture subsequently is introduced into a coking zone having a maximum temperature of 500° C., the gaseous products of the coking operation are recovered at least in part as condensed liquid and the incondensible gases have a lower sulfur content, and the solid coke is recovered from the coking operation in a form which is useful as fuel with a significantly decreased tendency to emit sulphur dioxide during such use.

EXAMPLES

Example I

This Example illustrates the use of calcium carbonate in decreasing sulphur emissions on combustion of coke formed from oil sands bitumen.

Samples of oil sands bitumen extracted from Athabasca oil sands were mixed respectively with crushed limestone and laboratory grade calcium carbonate in amounts sufficient to provide a molar ratio of Ca:S in the butumen of 1:2. The samples were coked at about 475° C. in a laboratory coker to form coke. Untreated samples were also coked. The volume of liquid distillates obtained was measured in each case.

The coke samples were combusted in oxygen at about 1000° C. and the amount of sulphur dioxide emitted was determined. The results are reproduced in the following Table I:

TABLE I

| Additive | Amount Used wt. % | SO$_2$ Release from coke wt. % S | Liquid Distillates wt. % bitumen |
|---|---|---|---|
| — | — | 5.9 | 75.7 |
| Limestone | 5.9 | 1.1 | 77.8 |
| CaCO$_3$ (pure) | 6.0 | 0.7 | 77.9 |

It will be seen from the results set forth in the above Table I that addition of the limestone and pure calcium carbonate to the bitumen prior to coking lead to a substantial decrease in sulphur dioxide formation on combustion of the coke. In addition, a significant increase in liquid distillates yield was obtained when the limestone and calcium carbonate were added.

Example II

This Example shows the effect of varying quantities of limestone on sulphur emission on coke combustion.

The procedure of Example I was repeated using varying quantities of limestone. The sulphur dioxide formation on combustion of coke, formed by coking at 475° C., was determined in each case. The results are reproduced in the following Table II:

TABLE II

| Limestone Addition wt. % | SO$_2$ release From Coke wt. % S |
|---|---|
| 0 | 5.8 |
| 2.1 | 3.1 |
| 4.1 | 1.8 |
| 6.0 | 1.0 |

The results of the above Table II show that there is a decrease in sulphur dioxide formation with increasing quantities of added limestone. The addition of further quantities of limestone had no appreciable effect on the quantity of sulphur dioxide released on combustion.

Example III

This Example illustrates the use of slaked lime and calcium oxide in decreasing sulphur emissions on combustion of coke formed from oil sands bitumen.

Samples of oil sands bitumen extracted from Athabasca oil sands were mixed respectively with slaked lime and calcium oxide in amounts sufficient to provide a molar ratio of Ca:S in the bitumen of 1 to 2. The samples were coked at about 475° C. in a laboratory coker to form coke. Untreated samples were also coked. The volume of liquid distillates obtained was measured in each case.

The coke samples were combusted in oxygen at about 1000° C. and the amount of sulphur dioxide emitted was determined. The results ae reproduced in the following Table III:

TABLE III

| Additive | Amount Used wt. % on Bitumen | SO$_2$ Release From Coke wt. % S on coke | Liquid Distillates wt. % on bitumen |
|---|---|---|---|
| 0 | — | 5.9 | 75.7 |
| Ca(OH)$_2$ | 4.88 | 1.1 | 79.7 |
| CaO | 3.66 | 0.75 | 78.1 |

The results of the above Table III demonstrate that the sulphur dioxide release from the coke is substantially decreased when slaked lime or calcium oxide are added to the bitumen prior to coking. In addition, a significant increase in liquid distillates is achieved.

Example IV

This Example illustrates the effect of quantities and coking temperature on results attained.

The procedure of Example III was repeated for various samples with differing quantities of slaked lime and some samples were coked at 430° C. and other samples were coked at 475° C. The results were reproduced in the following Table IV:

TABLE IV

| Coking Temperature | | | | | | | |
|---|---|---|---|---|---|---|---|
| 475° C. | | | | 430° C. | | | |
| Amount Used wt. % on bitumen | Ca:S Mole Ratio (Approx.) | SO$_2$ Release From Coke wt. % S on Coke | Liquid Distillate Yield wt. % | Amount used wt. % on Bitumen | Ca:S Mole Ratio (Approx.) | SO$_2$ Release From Coke wt. % | Liquid Distillate Yield wt. % Bitumen |
| 0 | — | 5.9 | 75.7 | 0 | — | 5.9 | 75.7 |
| 0.75 | | | 77.0 | | | | |
| 1.8 | 1:4 | 4.2 | 78.2 | 2.0 | 1:4 | 3.6 | 72.5 |
| 3.5 | 1:3 | 2.9 | 79.8 | 4.76 | 1:2 | 3.01 | 74.4 |
| 4.8 | 1:2 | 1.1 | 79.7 | 9.0 | 1:1 | 1.92 | 74.0 |

TABLE IV-continued

| | 475° C. | | | | 430° C. | | |
|---|---|---|---|---|---|---|---|
| Amount Used wt. % on bitumen | Ca:S Mole Ratio (Approx.) | SO₂ Release From Coke wt. % S on Coke | Liquid Distillate Yield wt. % | Amount used wt. % on Bitumen | Ca:S Mole Ratio (Approx.) | SO₂ Release From Coke wt. % | Liquid Distillate Yield wt. % Bitumen |
| | | | | 16.7 | 2:1 | 0.23 | 74.2 |

The results of the above Table IV demonstrate that significantly lower quantities of slaked lime are required with coking at 475° C. to decrease the sulphur emissions as compared with coking at 430° C. and that an increase in the yield of liquid product is attained only with coking at 475° C.

Determination of the sulphur content of the liquid phase showed that there was not much difference between the value at a coking temperature of 475° C. (3.0 wt.%) and a coking temperature of 430° C. (2.8 wt.%). The value remained constant irrespective of the quantity of slaked lime added.

Example V

This Example illustrates the effect of coking temperature on yield of liquid products.

The procedure of Example III was repeated for samples of bitumen to which slaked lime had been added in an amount corresponding to a mole ratio of Ca:S of about 1:2 (i.e. about 4.8 wt.% Ca(OH)₂) with the coking being effected at various temperatures. The results are reproduced in the following Table V:

TABLE V

| Coking Temperature | Liquid Distillate yield wt. % on bitumen |
|---|---|
| 442° C. | 73.3 |
| 455° C. | 77.4 |
| 460° C. | 79.3 |
| 475° C. | 79.7 |
| 475° C. (no additive) | 75.7 |

The results of the above Table V show that an increase in liquid distillate yield is attainable only at coking temperatures above 450° C. The increase in the yield increases rapidly at coking temperatures from 450° to 460° C. and then levels off above that temperature.

Example VI

This Example illustrates the distribution of sulphur in the various phases with increasing proportions of slaked lime addition to the bitumen.

The procedure of Example III was repeated on samples of bitumen to which slaked lime had been added in varying proportions, with the coking being effected at 475° C. The distribution of the total sulphur of the bitumen into the distillate, coke (combustible S), coker gas and ash (as SO₄⁼) phases was determined for each sample and the results are reproduced in the following Table VI:

TABLE VI

| wt. % Ca(OH)₂ on bitumen | Sulphur Distribution (wt. % of total in bitumen) | | | |
|---|---|---|---|---|
| | Distillates | Coke | Coker gas | Ash |
| 0 | 57 | 19 | 24 | |
| 2 | 57 | 14 | 11 | 18 |
| 3.5 | 60 | 11 | 10 | 19 |

TABLE VI-continued

| wt. % Ca(OH)₂ on bitumen | Sulphur Distribution (wt. % of total in bitumen) | | | |
|---|---|---|---|---|
| | Distillates | Coke | Coker gas | Ash |
| 5 | 58 | 4 | 3 | 35 |

It will be seen from the above Table VI that the sulphur content of the liquid product remains substantially constant while the combustible sulphur in the coke and the sulphur contents of the coker gas diminish substantially with increasing slaked lime additions.

Example VI

This Example compares typical data obtained using the procedure of this invention with commercial bitumen coking procedures.

Samples of bitumen to which 4.8 wt.% Ca(OH)₂ were added were coked at 475° C. and various determinations made. The results were compared with effecting the same coking in the absence of added slaked lime and also with the results known to be obtained by Suncor Ltd. and Syncrude Ltd. in their oil sand bitumen upgrading procedures. The results are reproduced in the following Table VII:

TABLE VII

| | Laboratory Scale | | Commercial Operations | |
|---|---|---|---|---|
| | Inventive Process | No Additive | Suncor | Syncrude |
| Net Coke Yield (wt. % on bitumen) | 13 | 13 | 20 to 25 | 15 |
| S in coke which can form SO₂ (wt. % on coke | 1.0 | 6.0 | 6.0 | 6 to 8 |
| Distillate Yield (wt. % on Bitumen) | 80 | 75 | 70 | 77 |
| % S in distillate | 3.1 | 3.1 | 3.3 | 3.7 |
| API of bitumen | 17 | 17 | 26 | 22 |
| Coke volatile content (wt. % coke) | 21[1] | 16.1 | 10 | 7.3 |
| Calorific value of coke BTU/lb × 10³ | 10.3 | 14.3 | 13.7 | 12.8 |
| Ash | 47[2] | 5.5 | 3.7 | 8.6 |

Notes:
[1]This result appears to be anomalous
[2]Contains substantial quantities of calcium sulphate.

The results of the above Table VII show that the present invention significantly decreases the sulphur emissive capability of the coke while not significantly adversely affecting the calorific value of the coke. The yield of liquid distillate is improved while the sulphur content thereof remains substantially unaffected.

Example VII

This Example illustrates the effect of the addition of calcium compounds to preformed coke.

Laboratory coke was prepared by batch (50 g) coking of oil sands bitumen. Aliquots of this coke were ground in a mortar and pestle with $Ca(OH)_2$ and sulfur combustible to $SO_2$ ($S/SO_2$) determined by the ASTM method in the mixture. Reference to Table VIII below shows that in order to achieve 1.0% $S/SO_2$ in the laboratory coke, it must contain approximately 16 wt.% $Ca(OH)_2$, i.e., a molar stoichiometric requirement Ca/S for the reduction from 5 to b 1.0% of 2.1:1.

Since the $Ca(OH)_2$ also removed $H_2S$ from the coker gases, it can be readily calculated from the published figures on sulfur distribution in the coking products obtained with and without $Ca(OH)_2$ addition (Fuel 61, 169, 1982) that in this pre-mixing process the calcium base is effective at sequestering the sulfur in the coker gases and during combustion of the coke at a mole ratio Ca:S of 1.4:1.

It should be pointed out that the post-addition results were obtained with grinding the coke and $Ca(OH)_2$ together. Simple mixing requires ratios of 3:1 or higher for comparable $S/SO_2$ reduction.

TABLE VIII

| Wt. % $Ca(OH)_2$ Mixed with Coke | Wt. % Sulfur in Coke Combustible to $SO_2$ |
|---|---|
| 0.2 | 4.97 |
| 2.8 | 4.41 |
| 6.2 | 3.30 |
| 11.1 | 2.35 |
| 16.0 | 0.68 |

SUMMARY OF DISCLOSURE

In summary of this disclosure, the present invention provides a procedure for decreasing the sulphur emissive capability of coke formed from heavy crude oils and residua. Modifications are possible within the scope of the invention.

What we claim is:

1. A process for the formation of a coke from a heavy crude oil or residua having an API gravity value of less than 25° and containing sulfur, which comprises:
   (a) uniformly dispersing solid particles of calcium carbonate in said heavy crude oil or residua in an amount corresponding to a molar ratio of calcium to sulphur in said crude oil or residua of about 1:5 to about 1:1 to form a uniform dispersion, consisting of said calcium carbonate and said crude oil or residua,
   (b) feeding said uniform dispersion to a coking zone having a temperature of about 400° to about 500° C. to effect evaporation of volatiles from said crude oil or residua and leave a solid coke product,
   (c) removing and recovering said volatiles from said coking zone at least in part as condensed liquid distillate, and
   (d) removing and recovering said coke from said coking zone as a product of said process, said coke having a decreased tendency to produce sulphur dioxide upon combustion in air compared to coke produced from said heavy crude oil or residua in the absence of step (a).

2. The process of claim 1 wherein said coking zone has a temperature of about 450° to about 500° C. and the yield of said liquid distillate is increased, as compared with effecting said coking without first effecting step (a).

3. The process of claim 1 wherein said molar ratio of Ca:S is about 1:2.

4. The process of claim 1 wherein said coking temperature is about 460° to about 480° C.

5. The process of claim 4 wherein said heavy crude oil is bitumen recovered from oil sands.

6. The process of claim 5 wherein the calcium carbonate is used in an amount of about 2.0 to about 8.0 wt.% of the bitumen.

7. The process of claim 1 wherein said particle size is about 5 to about 10 microns.

8. A process for the formation of a coke from a heavy crude oil or residua having an API gravity value of less than 25° and containing sulfur, which comprises:
   (a) uniformly dispersing solid particles of calcium compound selected from the group consisting of calcium hydroxide, calcium oxide and mixtures thereof in an amount corresponding to a molar ratio of calcium to sulfur in said crude oil or residua of about 1:3 to about 1:1 to form a uniform dispersion consisting of said calcium compound and said crude oil or residua,
   (b) feeding said uniform dispersion to a coking zone having a temperature of about 450° to about 500° C. to effect evaporation of volatiles from said crude oil or residua and leave a solid coke,
   (c) removing and recovering said volatiles from said coking zone at least in part as condensed liquid distillate having a greater yield than that attained by effecting said coking in the absence of step (a), and
   (d) removing and recovering said coke from said coking zone as a product of said process, said coke having a decreased tendency to produce sulphur dioxide upon combustion compared to coke produced from said heavy crude oil or residua in the absence of step (a).

9. The process of claim 8 wherein said molar ratio of Ca:S is about 1:2.

10. The process of claim 8 wherein said coking temperature is about 460° to about 480° C.

11. The process of claim 8 wherein said heavy crude oil is bitumen recovered from oil sands.

12. The process of claim 11 wherein the calcium compound is used in an amount of about 3.0 to about 8.0 wt.% of the bitumen.

13. The process of claim 8 wherein said particle size is about 5 to about 8 microns.

* * * * *